3,558,691
PREPARATION OF 2-ALKOXY TRIHALO-
TEREPHTHALATES
William J. Pyne, Painesville, Ohio, assignor to Diamond Shamrock Corporation, a corporation of Delaware
No Drawing. Filed Aug. 28, 1967, Ser. No. 663,525
Int. Cl. C07c 67/00
U.S. Cl. 260—473                                5 Claims

ABSTRACT OF THE DISCLOSURE

An improved process prepares compounds of the general formula:

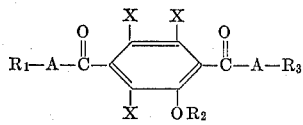

wherein A is sulfur or oxygen, X is halogen, $R_2$ is alkyl, and $R_1$ and $R_3$ are hydrogen or alkyl. The reaction is carried out, in a virtually anhydrous co-solvent liquid medium, with a metal alkoxide and a compound precursor having four aromatic ring halogens. One solvent is an alcohol and the other solvent is an inert, moderately high boiling liquid readily miscible with both the alcohol solvent and the metal alkoxide.

BACKGROUND OF THE INVENTION

Compounds corresponding to the above general formula are typically useful as pesticides and particularly as herbicides. Compounds representative of this type, along with their herbicidal activity, have been disclosed for example in U.S. Pat. 3,301,892. The halogens which are represented by X in the above general formula can be fluorine, chlorine, bromine or iodine, and are generally bromine or chlorine but preferably chlorine.

Although these compounds are useful, e.g., as pesticides, they are difficult to prepare, i.e., involve reactions which progress slowly and result in low product yields, severely detracting from their commercial potential. It is thus an object of the present invention to quickly and efficiently prepare such compounds from commercially available precursors.

SUMMARY OF THE INVENTION

The present invention relates to an improved process for preparing compounds of the general formula disclosed above wherein A is sulfur or oxygen, X is halogen, $R_2$ is alkyl, and when A is sulfur $R_1$ and $R_3$ are alkyl and when A is oxygen $R_1$ and $R_3$ are independently hydrogen or alkyl. The improvement is in the process wherein an aromatic ring halogen is replaced with the $-OR_2$ group of the above formula, and comprises establishing a virtually anhydrous co-solvent liquid medium of a first alcohol solvent and a second solvent, dispersing within the medium a metal alkoxide and a reaction precursor having four aromatic ring halogens, and permitting reaction between the precursor and the alkoxide. The first alcohol solvent corresponds to the formula $R_2OH$, with $R_2$ being defined above, and the second solvent is discussed in more detail hereinafter.

The "alkyl" group which can be represented by $R_1$, $R_2$, and $R_3$ can be methyl, ethyl, 2-propyl, 1-butyl, 2-butyl, and the like. Typically, these alkyl groups are lower alkyl, i.e., contain 1 to 6 carbon atoms.

DESCRIPTION OF THE PREFERRED EMBODIMENTS

The process of the present invention can be typically employed in two coinciding reaction paths both preparing compounds of the above general formula. In the first reaction path a tetrahaloterephthalate, such as the dimethyl tetrahaloterephthalate shown in U.S. Pat. 2,923,634, or an S-alkyl-2,3,5,6-tetrahalo-4-carboalkoxy thiobenzoate, or an S,S'-dialkyl tetrahalodithioterephthalate can be reacted directly in the process of the present invention. If desired, and preferably if $R_1$, $R_2$, and $R_3$ are to be the same, the tetrahaloterephthalates can be prepared by the reaction of the alcohol, corresponding to the formula $HOR_2$, with a tetrahaloterephthaloyl dihalide precursor and then, without isolation of the intermediate material, the resulting tetrahaloterephthalate can be reacted in the process of the present invention, with the first alcohol solvent being, at least in part, retained $HOR_2$.

In the second reaction path the process of the present invention can be carried out directly on tetrahaloterephthalic acid or tetrahalodithioterephthalic acid to effect ring replacement. Typically, the tetrahalodithioterephthalic acid can be readily converted, during ring replacement, to the corresponding S,S'-dialkyl ester with the alkyl radicals replacing the hydrogens on the sulfur atoms and corresponding to the $R_2$ portion of the ring alkoxy group. Thus, all of the immediate reaction precursors, that is, compounds having four aromatic ring halogens, and including those formed from tetrahaloterephthalolyl dihalide material, correspond to the formula:

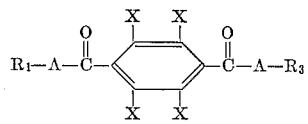

For this formula A and X are as defined above and $R_1$ and $R_3$ are independently hydrogen or alkyl. However, since the tetrahalodithioterephthalic acid precursors can react in the manner just discussed, the products prepared, when A is sulfur, virtually always have alkyl groups for $R_1$ and $R_3$.

When this second reaction path is taken with tetrahaloterephthalic acid, a substantial amount of acid can be retained after ring replacement. Subsequently, if alkyl ester derivatives are desired in place of acid groups on the resulting 2-alkoxy-3,5,6-trihaloterephthalic acid, this material can be reacted by any of the alkylation processes known to the art, such as reaction with an alkyl chloride or a dialkyl sulfate or the like, which has been shown, for example, in U.S. Pat. 3,301,892 to also be useful in the alkylation of related 2-hydroxy-3,5,6-trihaloterephthalic acid intermediates. Typically, because of the commercial availability of dimethyl 2,3,5,6-tetrachloroterephthalate and the desirable herbicidal activity of dimethyl 2-methoxy-3,5,6-trichloroterephthalate, the first reaction path is most generally employed, and efficiently converts the commercial precursor to the 2-methoxy derivative. For example, in a straightforward batch reaction, i.e., with simple stirring of the batch at room temperature and atmospheric pressure, conversions of better than 80 percent can be obtained overnight.

The process of the present invention is conducted with a metal alkoxide such as sodium methoxide, potassium methoxide, sodium ethoxide, potassium ethoxide, or their mixtures. Where a mixture of alkoxy substituents on the aromatic ring is desired, mixtures of the metal alkoxides can be employed, otherwise a single substance such as sodium methoxide is used to prepare a compound having a 2-methoxy group on the aromatic ring. Preferably, for efficiency, the metal alkoxide is formed in situ in the reaction medium by the addition of the appropriate metal, e.g., sodium or potassium to methanol and/or ethanol in the reaction medium. Advantageously, to augment the progress of the reaction, a slight molar excess of metal alkoxide is employed, e.g., 10–25 mole percent more than the stoichiometric requirements for completing the reaction.

The process of the present invention is carried on in a co-solvent liquid medium containing a first alcohol solvent such as methanol, ethanol, isopropanol, 1-butanol, 2-butanol, and the like or mixtures of these alcohols as mentioned before. For the formation simply of a methoxy group on the aromatic ring the first alcohol solvent is preferably just methanol, and is likewise ethanol for replacing the aromatic ring halogen with an ethoxy group, i.e., preferably the alcohol solvent used corresponds with the alkoxy group that is desired on the aromatic ring.

The second solvent is typically any material which is liquid under the conditions of the reaction and is "inert" to the reactants and the desired product, i.e., as the term is used herein, the second solvent is one which, under the conditions of the reaction, will not chemically react in the process of this invention with, for example, a reaction precursor such as dimethyl tetrachloroterephthalate or with the metal alkoxide. Generally, because of the advantageous reaction conditions discussed hereinbelow, the second solvent is liquid at about normal temperature and pressure, i.e., 25° C. and 760 mm. Hg and boils above about 65° C. under normal pressure. Additionally, the second solvent should be readily miscible with both the inorganic reactant, i.e., the metal alkoxide, as well as the first alcohol solvent. Suitable second solvents which can or have been used include dimethylformamide, dimethyl sulfoxide, tetrahydrothiophene 1,1-dioxide, tetrahydrofuran, diethylene glycol dimethyl ether, dimethylacetamide, triethylene glycol dimethyl ether, and miscible mixtures thereof.

Typically, for enhancing the progress of the reaction, the liquid medium contains at least about 10 percent by volume, based on the total amount of co-solvents, of the second solvent and can contain up to about 90 percent of such second solvent. Preferably for reaction efficiency the co-solvent liquid medium contains between about 15–50 percent of the second solvent based on the total of the two solvents.

The preparation proceeds under virtually anhydrous conditions to suppress the side reaction of the metal-organic oxide reactant with water. To obain such conditions, the co-solvents typically each contain less than about 0.1 weight percent water and preferably, for best side reaction suppression, contain less than about 0.05 weight percent water. For enhancing the yield of the desired product, the reaction advantageously takes place at a temperature below about 50° C. and preferably, for best yields, takes place within a temperature range from about 0° to about 35° C.

After preparation, the alkoxy substituted compounds can be recovered simply by filtration of the reaction medium to remove metal halide and subsequent crystallization of the product from the filtrate. Crystallization can be enhanced by the addition of water to the filtrate or by the use of other suitable liquid which is not a solvent for the product, and the product can then be washed with water or the like for removal of by-product metal halide, e.g., sodium or potassium halide. The crystalline product alternatively can be blended with water, filtered from the blend, and dried.

In order that those skilled in the art may more completely understand the present invention and the preferred methods by which the same may be carried into effect, the following specific example is offered:

EXAMPLE

Preparation of dimethylester of 3,5,6-trichloro-2-methoxyterephthalic acid

Into a five-liter, three-necked flask equipped with a stirrer, dropping funnel, thermometer, and condenser is placed 900 milliliters (mls. of anhydrous methyl alcohol. This alcohol was initially 99.8 weight percent methyl alcohol containing 0.053 weight percent water, which was thereafter dried over molecular sieves before charging to the flask. The condenser is vented to a fume hood to allow for removal from the system of any hydrogen formed during reaction and is further fitted with a drying tube which is employed to maintain the alcohol solvent in anhydrous condition. Subsequently 31 grams (1.35 gram-atoms) of dry metallic sodium is added to the alcohol.

After solution of the sodium in the alcohol, there is then gradually added to the contents of the flask a previously prepared solution formed by dissolving 320 grams of dimethyl tetrachlorterephthalate in 350 mls. of anhydrous dimethylformamide (dried over molecular sieves). The resulting solution in the flask turns clear after addition of the dimethylformamide solution and within 20 minutes a visible precipitate of sodium chloride is observed in the flask. The mixture is the stirred for 12 hours. Thereafter a sample, analyzed by vapor phase chromatography, discloses that virtually all of the dimethylester of tetrachlorterephthalic acid has reacted.

The resulting mixture in the flask is filtered and 15 liters of tap water are added to the filtrate. The solid precipitating from the resulting mixture is filtered, washed with 4 liters of water, and air dried. This procedure isolates 262.5 grams (83.5% yield) of a white solid having a melting point of 80–82° C. The elemental anaylsis checks for the desired dimethyl 3,5,6-trichloro-2-methoxyterephthalate.

|  | Percent calculated | Percent actual |
|---|---|---|
| Element: |  |  |
| Carbon | 40.3 | 40.4 |
| Hydrogen | 2.77 | 3.0 |
| Chlorine | 32.4 | 31.9 |

Molecular weight of a sample of the resulting solid is calculated on the basis of the structural formula $$C_{11}H_9Cl_3O_5$$

at 327 and is determined by mass spectrum anaylsis at 326 on the basis of an atomic weight for chlorine of 35.0.

I claim:
1. In the process for preparing a compound of the formula:

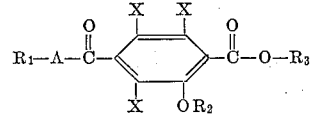

wherein: X is halogen, $R_2$ is alkyl, and $R_1$ and $R_3$ are independently selected from the group consisting of hydrogen and alkyl, which process involves the replacement of an aromatic ring halogen with the —$OR_2$ group of the above formula, the improvement which comprises;
 (1) establishing a virtually anhydrous co-solvent liquid medium of an alcohol solvent and a second solvent;
 (2) dispersing within said medium an alkali metal alkoxide and a reaction precursor having four aromatic ring halogens; and
 (3) permitting reaction between said precursor and said alkoxide at not substantially above moderate temperature thereby preparing said compound;
wherein said alcohol solvent is miscible with said second solvent and corresponds to the formula $R_2OH$, wherein $R_2$ is as defined above, and said second solvent is an inert liquid at about normal temperature and pressure, boils above about 65° C. at normal pressure, and is readily miscible with both said alkoxide and said alcohol solvent.

2. The process of claim 1 wherein said reaction is conducted at a temperature not substantially in excess of about 50° C. and $R_1$ and $R_3$ are independently selected from the group consisting of $C_1$–$C_6$ alkyl.

3. The process of claim 1 wherein said liquid medium contains less than about 0.1 weight percent water and X is chlorine or bromine.

4. The process of claim 1 wherein said alkali metal alkoxide is formed in situ in said medium and is selected from the group consisting of sodium methoxide, potassium methoxide, potassium ethoxide, sodium ethoxide, and mixtures thereof.

5. The process of claim 1 wherein said second solvent is selected from the group consisting of dimethylformamide, dimethyl sulfoxide, tetrahydrothiophene 1,1-dioxide, tetrahydrofuran, diethylene glycol dimethyl ether, dimethylacetamide, triethylene glycol dimethyl ether, and miscible mixtures thereof.

References Cited

Wagner et al.: "Synthetic Org. Chem." (1953), p. 226.
Weissberger: "Technique Org. Chem.," vol. III, 2nd ed. (1956) p. 475.

JAMES A. PATTEN, Primary Examiner

U.S. Cl. X.R.

260—455, 475, 502.6, 521